(12) United States Patent
Dange (10) Patent No.: US 12,476,814 B2
(45) Date of Patent: Nov. 18, 2025

(54) SYSTEM AND METHOD OF PRIVACY-AWARE INTER-CHANNEL COMMUNICATION BETWEEN A BUSINESS ENTITY AND A PERSON

(71) Applicant: Amod Ashok Dange, Mountain View, CA (US)

(72) Inventor: Amod Ashok Dange, Mountain View, CA (US)

(73) Assignee: Amod Ashok Dange, Mountain View, CA (US)

( * ) Notice: Subject to any disclaimer, the term of this patent is extended or adjusted under 35 U.S.C. 154(b) by 176 days.

(21) Appl. No.: 18/535,512

(22) Filed: Dec. 11, 2023

(65) Prior Publication Data
US 2024/0195630 A1    Jun. 13, 2024

Related U.S. Application Data

(60) Provisional application No. 63/431,753, filed on Dec. 12, 2022.

(51) Int. Cl.
*H04L 9/32* (2006.01)
*H04L 9/08* (2006.01)
*H04L 9/30* (2006.01)

(52) U.S. Cl.
CPC .......... *H04L 9/3231* (2013.01); *H04L 9/0866* (2013.01); *H04L 9/3073* (2013.01)

(58) Field of Classification Search
CPC .... H04L 9/3231; H04L 9/0866; H04L 9/3073
See application file for complete search history.

(56) References Cited

U.S. PATENT DOCUMENTS

| | | | |
|---|---|---|---|
| 2017/0222996 A1* | 8/2017 | Adams | H04L 63/0846 |
| 2017/0374073 A1* | 12/2017 | Schoppmeier | H04L 63/102 |
| 2018/0115426 A1* | 4/2018 | Andrade | H04L 9/3231 |
| 2023/0245181 A1* | 8/2023 | Doumar | G06Q 30/0277 705/14.73 |
| 2023/0419308 A1* | 12/2023 | Madisetti | G06Q 20/38 |
| 2024/0348603 A1* | 10/2024 | Tussy | G06V 40/167 |

* cited by examiner

*Primary Examiner* — William S Powers
(74) *Attorney, Agent, or Firm* — Jason A. Smith; Shumaker, Loop & Kendrick, LLP (57) ABSTRACT

A system and a method for enabling privacy-aware inter-channel communication between a business entity and a person. The system includes a people registry module that allows people to register using anonymized biometric factors, and a business registry module for businesses to register using a communication address. The system generates a cryptographic key-value pair to enforce the exclusive permission to exchange messages between the business entity and the customer. The customer controls the permission for the business entity to send promotional messages through the exclusive communication channel. Overall, the disclosed system protects a person's privacy by decoupling the person's identity from their contact information.

20 Claims, 6 Drawing Sheets

SYSTEM AND METHOD OF PRIVACY-AWARE INTER-CHANNEL COMMUNICATION BETWEEN A BUSINESS ENTITY AND A PERSON

CROSS-REFERENCE TO RELATED APPLICATIONS AND PRIORITY

The present application claims priority from U.S. Provisional Application No. 63/431,753 filed on Dec. 12, 2022, entitled "METHOD OF INTEROPERATING BETWEEN EMAIL, TEXT MESSAGING, AND INSTANT MESSAGING".

TECHNICAL FIELD

The present subject matter described herein, in general, relates to a field of enhancing intercommunication across digital messaging channels. More particularly, the present subject matter discloses a system and method for facilitating privacy-aware inter-channel communication between customers and business entities through a combination of email, text messaging, and instant messaging.

BACKGROUND

The subject matter discussed in the background section should not be assumed to be prior art because of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

In the field of digital communication, several technologies are employed. These technologies often include email services, SMS gateways, and instant messaging applications. Businesses and individuals typically rely on these separate communication channels to connect with their intended recipients.

Since its invention in 1971, email has become the go-to channel for asynchronous communication. It's ubiquity has driven down its cost to almost nothing. However, the non-stop deluge of emails flooding the internet has created problems. In 2021, a whopping 319.6 billion emails were transmitted daily, and 45.37% of them were spam. The carbon footprint of an email varies from 0.3 g $CO_2e$ for a spam email to 4 g (0.14 oz) $CO_2e$ for a regular email and 50 g (1.7 oz) $CO_2e$ for one with a photo or large attachment. Additionally, nearly 96% of phishing attacks are conducted using email. Businesses are also under business email compromise (BEC) attack, with 77% facing scams like payroll-redirection and supplier-invoicing fraud. These attacks cost businesses an average of $5.96 million per year. To make matters worse, 83% of organizations fell for phishing attacks in 2021. Regular folks aren't safe either, as 39% received suspicious email attachments, and 15% got emails pretending to be from their work.

Text messaging, invented in 1992, is another popular way people communicate in the modern world. But spam texts have also been on the rise. From 2020 to 2021, there was a 58% increase in spam texts. In September 2021, 1.227 million spam texts were sent, jumping to 10.89 billion in August 2022. In 2021, people got bombarded with spam, receiving around 41 spam texts per month. One in three Americans have been tricked by SMS scams, and only 35% of people realized that they were being targeted.

The contact list presents perhaps the greatest vulnerability when it comes to privacy. Email and phone number protocols were designed in an era when privacy was not a concern. Therefore, any number of people can reach a person at the same email address or phone number. There is no exclusive 1:1 messaging permission structure. You can only block someone after they have successfully sent you unsolicited messages. Critically, your email address and phone number can easily be revealed (willfully or inadvertently) by anyone whose contact lists you appear in. There is no mechanism to enable people to meaningfully control who sees their contact information.

In the field of communication through email, text messaging, and instant messaging, traditional methods have typically relied on standard email addresses or phone numbers as the primary identifiers for users. These identifiers are often linked directly to a user's identity, making it challenging to maintain privacy and control over the information shared during online communications. Users sign up for services using their actual email addresses or phone numbers, which can expose their identities to businesses and service providers. Additionally, the exchange of messages between users and businesses is typically facilitated through conventional communication protocols, with email following SMTP (Simple Mail Transfer Protocol), text messages utilizing SMS (Short Message Service), and instant messaging platforms using various proprietary protocols, further lacking a robust mechanism for users to manage and control who gets to send them promotional messages.

Additionally, addressing issues related to spam, phishing, and fraudulent communication across email, text messaging, and instant messaging is essential. Providing protection against malicious actors and ensuring that only legitimate and authorized messages are exchanged is crucial for individuals and businesses alike.

Therefore, there is a long-standing need for an improved system and method for facilitating customer-controlled, privacy-aware, inter-channel communication between email, text messaging, and instant messaging, to overcome the above-mentioned problems.

SUMMARY

This summary is provided to introduce concepts related to a system and a method for enabling privacy-aware inter-channel communication between a business entity and the customer without having to reveal their actual communication address to the business entity, and the concepts are further described below in the detailed description. This summary is not intended to identify essential features of the claimed subject matter, nor is it intended for use in determining or limiting the scope of the claimed subject matter.

In one implementation of the present disclosure, a system of privacy-aware inter-channel communication between a business entity and a person is illustrated in accordance with an embodiment of the invention. The system comprises a memory and a processor coupled with the memory. The processor is configured to execute programmed instructions stored in the memory. For the purpose of registering people in a people registry, the processor may be configured to execute the programmed instruction to enable a person to register in the people registry based on their biometric sample, combine one or more biometric factors, process the biometric sample to generate an anonymized biometric hash of the person, and register the person in the people registry using the anonymized biometric hash of the person. Further, for the purpose of registering a business entity in a business registry, the processor may be configured to execute the programmed instruction to enable a business entity to register in the business registry, based on a business communication address associated with the business entity. Further, for the purpose of creating a business-customer account, the processor may be configured to execute programmed instructions of an account creation module. The processor may execute programmed instructions for generating a cryptographic key-value pair for a customer. Here, the customer corresponds to the person registered in the people registry. The cryptographic key-value pair comprises a customer public key and a customer private key. Further, the processor may execute programmed instructions for creating a customer communication address for the customer of the business-customer account. Further, the processor may execute programmed instructions for generating a business-customer communication address hash. The business-customer communication address hash is generated by applying a hashing algorithm on a combination of the business communication address associated with the business entity and the customer communication address created for the customer. Further, the processor may execute programmed instructions for generating a record in the memory. The record comprises the customer public key corresponding to the business-customer communication address hash. Further, for the purpose of authenticating a business-customer account on an event of a new communication between the business entity and the customer, the processor may be configured to execute programmed instructions of an authentication module. The processor may execute programmed instructions for extracting, from the new communication, a first communication address associated with the business entity and a second communication address associated with the customer. The processor may further execute programmed instructions for generating a communication address hash based on the combination of both the first communication address and the second communication address. Further, the processor may execute programmed instructions for comparing the communication address hash with the business-customer communication address hash, from the record stored in the memory. Further, in case the communication address hash matches the business-customer communication address hash, the processor may further execute programmed instructions for converting the new communication into a customer-compatible communication and further, encrypting the customer-compatible communication using the customer public key corresponding to the communication address hash. Furthermore, the process may execute programmed instructions for transmitting the encrypted communication to the customer, thus safeguarding the individual's privacy.

In another embodiment of the invention, the system may incorporate various forms of a biometric hash, which may comprise encrypted factors of face, fingerprint, iris, retina, voice, other biometric identity, or a combination thereof. Further, business communication address comprises email addresses or phone numbers linked to the business entity, while customer communication address may take the form of proxy email addresses or proxy phone numbers connected to the customer. Furthermore, the cryptographic key-value pair establishes an exclusive relationship between the business entity and the customer within the business-customer account. Moreover, the new communication sent by the business entity to the customer could be in the form of emails or text messages. In one embodiment, the processor may execute programmed instructions for disregarding the new communication between the business entity and the customer if the communication address hash does not match the business-customer communication address hash stored in the memory. Furthermore, the record may comprise a customer promotion preference corresponding to the business-customer communication address hash, either set to "YES" or "NO." The authentication module may be used to determine whether a new communication is transactional or promotional. If a new communication is transactional, the processor encrypts it's customer-compatible communication using the customer public key and transmits the same to the customer. If a new communication is promotional, and the customer promotion preference is set to "YES", the processor encrypts it's customer-compatible communication using the customer public key and transmits the same to the customer. If a new communication is promotional and the customer preference is set to "NO", the processor does not transmit the communication to the customer. Furthermore, the hashing algorithm used by the processor corresponds to a one-way hash function which is computationally difficult to reverse hash.

In another implementation of the present disclosure, a method of privacy-aware inter-channel communication between a business entity and a person is illustrated in accordance with an embodiment of the invention. The method may comprise one or more steps to register one or more people to a people registry and one or more business entities to a business registry. The method may comprise a step of registering a person to in the people registry based on an anonymized biometric hash of the person. Furthermore, the method may comprise a step of registering the business entity in the business registry based on a business communication address associated with the business entity. Furthermore, the method may comprise one or more steps for creating a business-customer account, encompassing the generation of a cryptographic key-value pair comprising a customer's public key, creating a customer communication address for the customer, generating a business-customer communication address hash. The business-customer communication address hash is generated by applying a hashing algorithm on a combination of the business communication address associated with the business entity and the customer communication address associated with the customer. Further, the method may comprise a step of generating a record in the memory which comprises the customer public key corresponding to the business-customer communication address hash. Further the method may comprise one or more steps of authenticating the business-customer account on an event of a new communication between the business entity and the customer. The method comprises a step of extracting, from the new communication, a first communication address associated with the business entity and a second communication address associated with the customer. Further the method may comprise a step of generating a communication address hash based on the combination of both the first communication address and the second communication address. Further, the method may comprise a step of comparing the communication address hash with the business-customer communication address hash, from the record stored in the memory. The method may further comprise steps of converting the new communication into a customer-compatible communication and encrypting the customer-compatible communication using the customer public key corresponding to the communication address hash, in case of matching the communication address hash with the business-customer communication address hash.

Further, the method may comprise a step of transmitting the encrypted communication to the customer which safeguards the individual's privacy.

In essence, the disclosed system and the method establishes a secure, privacy-aware multi-channel communication framework between business entities and individuals, safeguarding privacy and data integrity while facilitating seamless and protected interactions.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to refer like features and components.

FIGS. 3.A and 3.B illustrates a flowchart describing a method 300 for enabling privacy-aware inter-channel communication between the business entity and the person, in accordance with an embodiment of the present subject matter.

FIGS. 4.A and 4.B illustrates an exemplary flow diagram 400 describing the method 300 for enabling privacy-aware inter-channel communication between the business entity and the person through customer-compatible communication, in accordance with an embodiment of the present subject matter.

DETAILED DESCRIPTION

Reference throughout the specification to "various embodiments," "some embodiments," "one embodiment," or "an embodiment" means that a particular feature, structure, or characteristic described in connection with the embodiment is included in at least one embodiment. Thus, appearances of the phrases "in various embodiments," "in some embodiments," "in one embodiment," or "in an embodiment" in places throughout the specification are not necessarily all referring to the same embodiment. Furthermore, the particular features, structures or characteristics may be combined in any suitable manner in one or more embodiments. Following is an example which is illustrative only and the invention accommodates any and every variation of the example provided below that shall serve the same purpose and is obvious to a person skilled in the art.

The words "comprising," "having," "containing," and "including," and other forms thereof, are intended to be equivalent in meaning and be open ended in that an item or items following any one of these words is not meant to be an exhaustive listing of such item or items or meant to be limited to only the listed item or items. It must also be noted that, the singular forms "a," "an," and "the" include plural references unless the context clearly dictates otherwise. Although any methods similar or equivalent to those described herein can be used in the practice or testing of embodiments of the present disclosure, the exemplary methods are described. The disclosed embodiments are merely exemplary of the disclosure, which may be embodied in various forms.

Historically, electronic communication has relied on ordinary email addresses or phone numbers as the key user identifiers, tying them directly to users' identities and impairing privacy. Users often expose their identity to business entities by signing up with their non-privacy-aware, legacy-format contact information. Additionally, legacy communication protocols are frequently used without proper control over advertising messages.

In today's digital landscape, authenticated and frictionless communication between users and business entities is paramount. People engage with businesses in a variety of ways, ranging from email to text messaging to instant messaging. There is a dire need to interoperate between various communication channels. An integrated inter-channel communication system holds the promise of enhancing user experience, improving response times, and bolstering the efficiency of business interactions, all while maintaining data security and privacy.

In this context, the present disclosure illustrates a system and a method for enabling privacy-aware inter-channel communication between a business entity and a person, an innovative solution that transforms communication by bringing privacy to people and authenticity to business entities.

In light of the above-mentioned limitations, the present subject matter provides inventive solutions to address the longstanding challenges of user privacy and messaging permission management in the realm of email, text messaging, and instant messaging interoperability. A novel approach that uses anonymized biometric hashes as peoples' primary identifiers, and exclusive proxy communication addresses generated for people to use when they sign up for business services, produces exceptional value for all.

Figure 1:
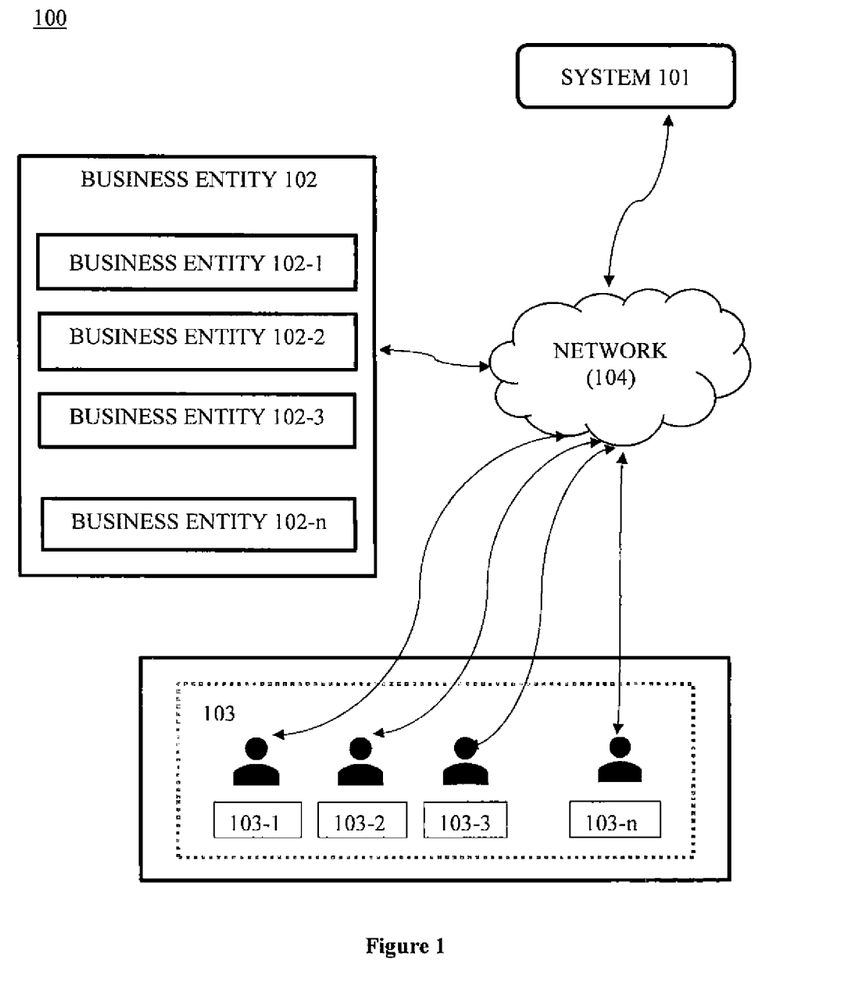
FIG. 1 illustrates a network implementation 100 of a system 101 for privacy-aware inter-channel communication between a business entity and a person, in accordance with an embodiment of a present subject matter.

Now referring to FIG. 1, a network implementation 100 of system 101 for enabling privacy-aware inter-channel communication between a business entity and a person, is illustrated in accordance with an embodiment of a present subject matter. In one embodiment, the system 101 may correspond to a platform for enabling the privacy-aware communication between one or more business entities (102-1, 102-2, . . . 102-n, collectively referred to as a business entity 102) registered on the platform and one or more persons (103-1, 103-2, 103-3 . . . 103-n, collectively referred to as a person 103), registered on the platform, by interoperating between the email, text messages and instant messaging. Further, the system 101 is communicatively coupled to the person 103 and the business entity 102 through a network 104. In an embodiment, the system 101 may act as an intermediary for communication between the business entity 102 and the person 103. The system 101 may be configured to register person 103 as well as business entities 102 over the system 101. Further, the system 101 may be configured to authenticate each communication made by the business entity 102 to the person 103 to ensure the user's privacy, security and permission control over the communication directed to the user. A detailed explanation of various components of the system 101 will be provided below in reference to description of FIG. 2.

In an exemplary embodiment, the business entity 102 comprises a set of online service providers, for example but not limited to news service, subscription services, e-commerce service, purchase service, job service, matrimonial service, lifestyle service, advertising and marketing service, networking service platform, media platform, messaging service, blog service, question and answer service, searching service, analysis service, task service, project specific service, consulting service, booking service, travel service, information service, direction, map and location specific services, health service, education and training service, review service, entertainment service, sports service, finance and stock service, mobile service, weather service, programming or web site development service, secretarial service, accounting service, designing service, information and data collecting, categorizing, presenting and organizing services, recipe service, communication and support services, outsourcing services and customize service. In one embodiment, a person 103 may subscribe to the set of services provided by the business entities 102 using the system 101. The person 103 after subscribing to the set of services provided by the business entities 102, may be referred to as a customer of the business entity 102.

In another embodiment, the person 103 is communicating with the system 101 through a user device. The user device may be any electronic device, portable communication device such as a mobile telephone, that also contains other functions, such as PDA, a handheld device and/or music player functions, image capturing device, machine, a workstation, software, automated computer program, a robot, laptops, or tablet computers with touch-sensitive surfaces (e.g., touch screen displays and/or touch pads), are, optionally, used. In one embodiment, the user device is enabled with biometric scanning capabilities. It should also be understood that, in some embodiments, the user device is not a portable communications device, but is a desktop computer associated with a biometric scanning device.

In one embodiment, the network 104 may be a cellular communication network used by customer 103 such as a peer-to-peer network, internet-enabled mobile phones, tablets, or a virtual device. In another embodiment, the customers may support communication over one or more types of networks in accordance with the described embodiments. For example, customers 103 and business entities 102 connected via network 104 may support communications over a Wide Area Network (WAN), the Internet, cloud network, a telephone network (e.g., analog, digital, POTS, PSTN, ISDN, xDSL), a mobile telephone network (e.g., CDMA, GSM, NDAC, TDMA, E-TDMA, NAMPS, WCDMA, CDMA-2000, UMTS, 3G, 4G, 5G, 6G), a radio network, a television network, a cable network, an optical network (e.g., PON), a satellite network (e.g., VSAT), a packet-switched network, a circuit-switched network, a public network, a private network, and/or other wired or wireless communications network configured to carry data. The aforementioned customers and business entities connected via network 104 may support wireless local area network (WLAN) and/or wireless metropolitan area network (WMAN) data communications functionality in accordance with Institute of Electrical and Electronics Engineers (IEEE) standards, protocols, and variants such as IEEE 802.11 ("WiFi"), IEEE 802.16 ("WiMAX"), IEEE 802.20x ("Mobile-Fi"), and others.

In one embodiment, the system 101 can be implemented using hardware, software, or a combination of both, which includes using where suitable, one or more computer programs, mobile applications, or other software applications deployed either on-premises over the corresponding computing terminals or virtually over cloud infrastructure. The system 101 may include various micro-services or groups of independent computer programs which can act independently in collaboration with other micro-services. The system 101 may also interact with a third-party or external computer system. Internally, the system 101 may be the central processor of all requests for transactions by the various actors or users of the system. A critical attribute of the system 101 is that it can complete an online transaction by a system user in collaboration with other systems. In another embodiment, the system 101 may be configured to integrate with various technologies such as, but not limited to, chatbots, personal assistants, voice assistants, LLMs, simulations, and extended reality platforms including virtual reality (VR), mixed reality (MR), augmented reality (AR), and other advanced technologies.

Figure 2:
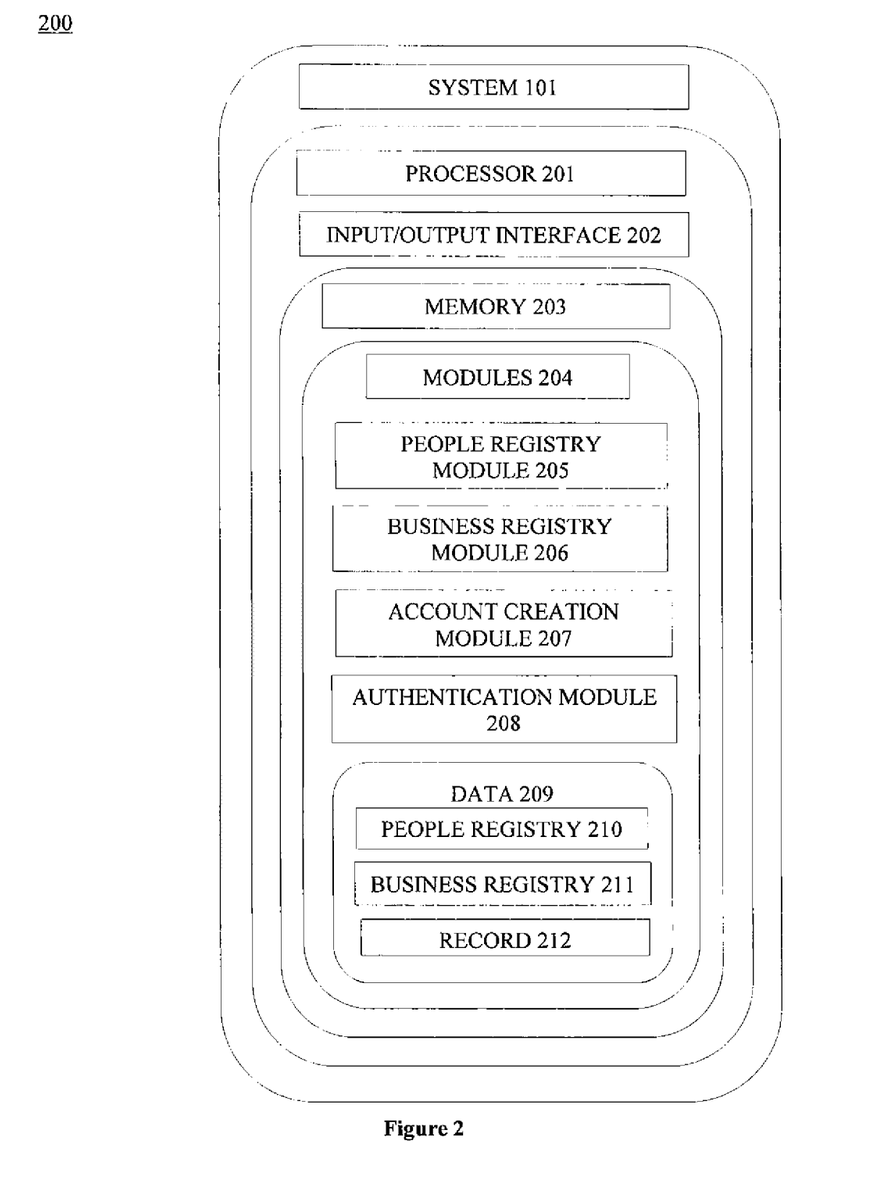
FIG. 2 illustrates components of the system 101 for privacy-aware inter-channel communication between the business entity and the person, in accordance with an embodiment of a present subject matter.

Now, referring to FIG. 2, various components of the system 101 for privacy-aware inter-channel communication between the business entity 102 and the person 103 are illustrated, in accordance with an embodiment of the present subject matter. As shown, the system 101 comprises a processor 201, an input/output interface 202 and a memory 203. The memory 203 comprises a set of modules 204. The set of modules 204 comprises a people registry module 205, a business registry module 206, an account creation module 207, and an authentication module 208. In one embodiment, the processor 201 is configured to fetch and execute computer-readable programmed instructions, stored in the memory 203, corresponding to each module 204. In an embodiment, the programmed instructions may include routines, programs, objects, components, data structures, etc., which perform particular tasks, functions, or implement particular abstract data types. Further, the memory 203 comprises a set of data 209. The set of data 209 comprises a people registry 210, a business registry 211 and a set of records 212. Further, the data 209 amongst other things, serves as a repository for storing data processed, received, and generated by one or more components and programmed instructions.

In one embodiment, the processor 201, in one embodiment, may comprise a standard microprocessor, microcontroller, central processing unit (CPU), distributed or cloud processing unit, state machines, logic circuitries, and/or any devices that manipulate signals based on operational instructions and/or other processing logic that accommodates the requirements of the present invention. Further, the input/output (I/O) interface 202 is an interface to other components of the system 101. The I/O interface 202 may include a variety of software and hardware interfaces, for example, a web interface, a graphical user interface, and the like. The I/O interface 202 may allow the system 101 to interact with the user directly or through the user devices. Further, the I/O interface 202 may enable the system 101 to communicate with other computing devices, such as web servers and external data servers (not shown). The I/O interface 202 can facilitate multiple communications within a wide variety of networks and protocol types, including wired networks, for example, LAN, cable, etc., and wireless networks, such as WLAN, cellular, or satellite. The I/O interface 202 may include one or more ports for connecting a number of devices to one another or to another server. In one embodiment, the I/O interface 202 allows the system 101 to be logically coupled to other user devices, some of which may be built in. Illustrative components include tablets, mobile phones, scanner, printer, wireless device, etc. Further, the processor 201 can read data from various entities such as the memory 203 or I/O interface 202.

In one embodiment, the memory 203 may include any computer-readable medium known in the art including, for example, volatile memory, such as static random-access memory (SRAM) and dynamic random-access memory (DRAM), and/or non-volatile memory, such as read-only memory (ROM), erasable programmable ROM, flash memories, hard disks, Solid State Disks (SSD), optical disks, magnetic tapes, memory cards, virtual memory and distributed cloud storage. The memory 203 may be removable, non-removable, or a combination thereof. The memory 203 may include routines, programs, objects, components, data structures, etc., which perform particular tasks or implement particular abstract data types. The memory 203 may include programs or coded instructions that supplement applications and functions of the system 101. In one embodiment, the memory 203, amongst other things, serves as a repository for storing data processed, received, and generated by one or more of the programs or the coded instructions. In yet another embodiment, the memory 203 may be managed under a federated structure that enables adaptability and responsiveness of the system 101.

Further in another embodiment, the memory 203 comprises the set of modules 204. Further the set of modules 204 comprises the people registry module 205. In an embodiment of the present subject matter, the people registry module 205 may comprise a set of computer programmed instructions for allowing one or more persons 103 to register with the system 101 by using a set of biometric factors. Registering with the system 101 may correspond to storing a biometric hash of the set of biometric factors of the person into the people registry 210. The biometric hash of a biometric factor corresponds to an encrypted factor of the corresponding biometric factor. The biometric factor corresponds to face, fingerprint, iris, retina, voice, other biometric identity, or a combination thereof. In one implementation, the biometric hash of a biometric factor may be calculated by hashing the corresponding biometric factor using a hashing algorithm. The hashing algorithm may correspond to a one-way hash function which is computationally difficult to reverse hash. In a related embodiment, registering with the system 101 may correspond to storing an anonymized/encrypted biometric hash of the person 103 into the people registry 210. Furthermore, persons 103 may be enabled to maintain a distributed global people's registry. The Distributed Global People Registry may be an autonomous free public utility that stores the public-key of every registered person 103.

Similarly, the set of modules 204 comprises the business registry module 206. In an embodiment of the present subject matter, the business registry module 206 may comprise a set of computer programmed instructions for allowing one or more business entities 102 to register with the system 101 by using a set of business communication address associated with the business entity 102. Registering with the system 101 may correspond to storing an encrypted business communication address of the business entity 102 into the business registry 211. The business communication address corresponds to email address, phone number, other business identity, or a combination thereof. In one implementation, the encrypted business communication address may be calculated by hashing the corresponding business communication address using a hashing algorithm. The hashing algorithm may correspond to a one-way hash function which is computationally difficult to reverse hash. In a related embodiment, registering with the system 101 may correspond to storing an encrypted business communication address of the business entity 102 into the business registry 211. Further, the business registry 211 via a business registry module 206 may allow the business entity 102 to register and undergo a verification process. Further, this verification process may include confirming a business identity, ownership of an email domain, and the ownership of a text message-enabled phone number, ensuring trust and authenticity.

In yet another embodiment, the set of modules 204 comprises the account creation module 207. In an embodiment of the present subject matter, the account creation module 207 may comprise a set of computer programmed instructions for creating a business-customer account corresponding to a business entity 102 and a person 103. The business customer account represents a relationship between the business entity 102 and the person 103. The business entity 102 corresponding to the business-customer account, necessarily should be registered in the business registry 211 of the system 101, may provide a set of services to the person 103. Further, the person 103 corresponding to the business-customer account, necessarily should be registered in the people registry 210 of the system 101, may receive service or communication from the corresponding business entity 102. In an embodiment, the person 103 corresponding to the business-customer account may be referred to as a customer of the business entity 102. The computer programmed instructions corresponding to the account creation module 207 may be executed when a person 103 makes an attempt to associate with the business entity 102 using the system 101. In an embodiment, the business entity 102 of the business customer account may send a communication to the customer 103. The communication may be performed through a communication medium from one of email communication, text message communication, instant messaging communication, or a combination thereof. The communication may either be a type of transactional communication or a promotional communication. The transaction communication may refer to the communication made corresponding to the service for which the customer 103 has associated or subscribed with the business entity 102. The promotional communication may refer to the communication which the business entity 102 may send to the customer 103 for advertising about any other services, not subscribed by the customer 103, may be provided by the business entity 102.

In an exemplary embodiment of the present invention, the account creation module 207 may comprise a set of computer programmed instructions for generating a cryptographic key-value pair. The cryptographic key-value pair may represent a relationship between business entity 102 and the customer 103. The cryptographic key-value pair may support numerous Internet standards, such as but not limited to Transport Layer Security (TLS), Secure Hashing Algorithm v1 (SHA-1), SHA-256, SHA-384, SHA-512, MD5, S/MIME, PGP. Diffie-Hellman key exchange, Digital Signature Algorithm and RSA. In an embodiment, the cryptographic key-value pair comprises a customer public key and customer private key. The customer public key may be used to encrypt any communication targeted to the customer 103, in contrast the customer private key may be used to decrypt the communication received by the customer 103. In another exemplary embodiment of the present invention, the account creation module 207 may comprise a set of computer programmed instructions for creating a customer communication address (or proxy communication address such as proxy email address, proxy phone number) for the customer 103 of the business-customer account. The customer communication address may be used by the business entity 103 to communicate with the customer 103. In yet another exemplary embodiment of the present invention, the account creation module 207 may comprise a set of computer programmed instructions for generating a business-customer communication address hash of the business-customer account. In an implementation, the business-customer communication address hash is generated by applying a hashing algorithm on a combination of the business communication address associated with the business entity 102 and the customer communication address (proxy address) associated with the customer 103. The hashing algorithm may correspond to a one-way hash function which is computationally difficult to reverse hash. In yet another exemplary embodiment of the present invention, the account creation module 207 may comprise a set of computer programmed instructions for generating a record 212 in the memory 203 corresponding to the business-customer account. In one implementation, the record 212 corresponds to a database comprising an entry of relationship of the business entity 102 with the customer 103. In one embodiment, the record comprises a customer public key corresponding to the business-customer address hash. In a related embodiment, the record may also comprise a customer promotion preference flag along with the customer public key corresponding to the business-customer address hash. The customer promotion preference flag gives control to the customer 103 of the system 101 to opt for either receiving or not receiving promotional communications from the particular business entity 102 of the business-customer account. The customer promotion preference flag comprises either "YES" or "NO".

In yet another embodiment, the set of modules 204 comprises the authentication module 208. In an embodiment of the present subject matter, the authentication module 208 may comprise a set of computer programmed instructions for authenticating the business-customer account, in an event of a new communication between the business entity 102 and the customer 103. The new communication corresponds to either an email or a text message, sent by the business entity 102 to the customer 103. In an exemplary embodiment of the present invention, the authentication module 208 may comprise a set of computer programmed instructions for extracting a first communication address and a second communication address from the new communication. The first communication address may be associated with the business entity 102 of the new communication and the second communication address may be associated with the customer 103 of the new communication. In another exemplary embodiment of the present invention, the authentication module 208 may comprise a set of computer programmed instructions for generating a communication address hash based on the first communication address and the second communication address. The communication address hash may be generated by applying the hashing algorithm on the combination of the first communication address and the second communication address. In yet another exemplary embodiment of the present invention, the authentication module 208 may comprise a set of computer programmed instructions for comparing the communication address hash with the business-customer communication address hash, from the record 212 stored in the memory 204. The comparison is performed in order to identify a pre-established relationship between the business entity 102 and the customer 103. In case the communication address hash does not match the business-customer communication address hash, the authentication module 208 may disregard the new communication between the business entity 102 and the customer 103 of the new communication. In case the communication address hash matches the business-customer communication address hash, the authentication module 208 may also identify the value of customer public key and/or the customer promotion preference flag corresponding to the communication address hash. The processor 201 is configured to execute as a set of computer-programmed instructions for converting the new communication into a customer-compatible communication. Further, the processor 201 is configured to execute a set of computer programmed instructions for encrypting the customer-compatible communication using the customer public key corresponding to the communication address hash. Further, the processor 201 is configured to execute a set of computer programmed instructions for transmitting it to the customer 103.

In yet another embodiment, the authentication module 208 may comprise a set of computer programmed instructions for a type of the new communication whether a transactional communication or a promotional communication. In case of the transactional communication, the processor 201 is configured to encrypt the transactional communication using the customer public key and transmitting the encrypted transactional communication to the customer 103 of the new communication. In case of the promotional communication and the customer promotion preference flag is "YES", the processor 201 is configured to encrypt the promotional communication using the customer public key and transmitting the encrypted promotional communication to the customer 103 of the new communication. Furthermore, in case of the promotional communication and the customer promotion preference flag is "NO", the processor 201 may disregard the promotional communication between the business entity 102 and the customer 103 of the new communication. In another embodiment, the processor 201 of the system 101 may execute a set of computer programmed instructions for sending a prespecified message to the business entity 102 regarding customer's preference of not receiving the promotional communication from the business entity 102 of the new communication.

Figure 3:
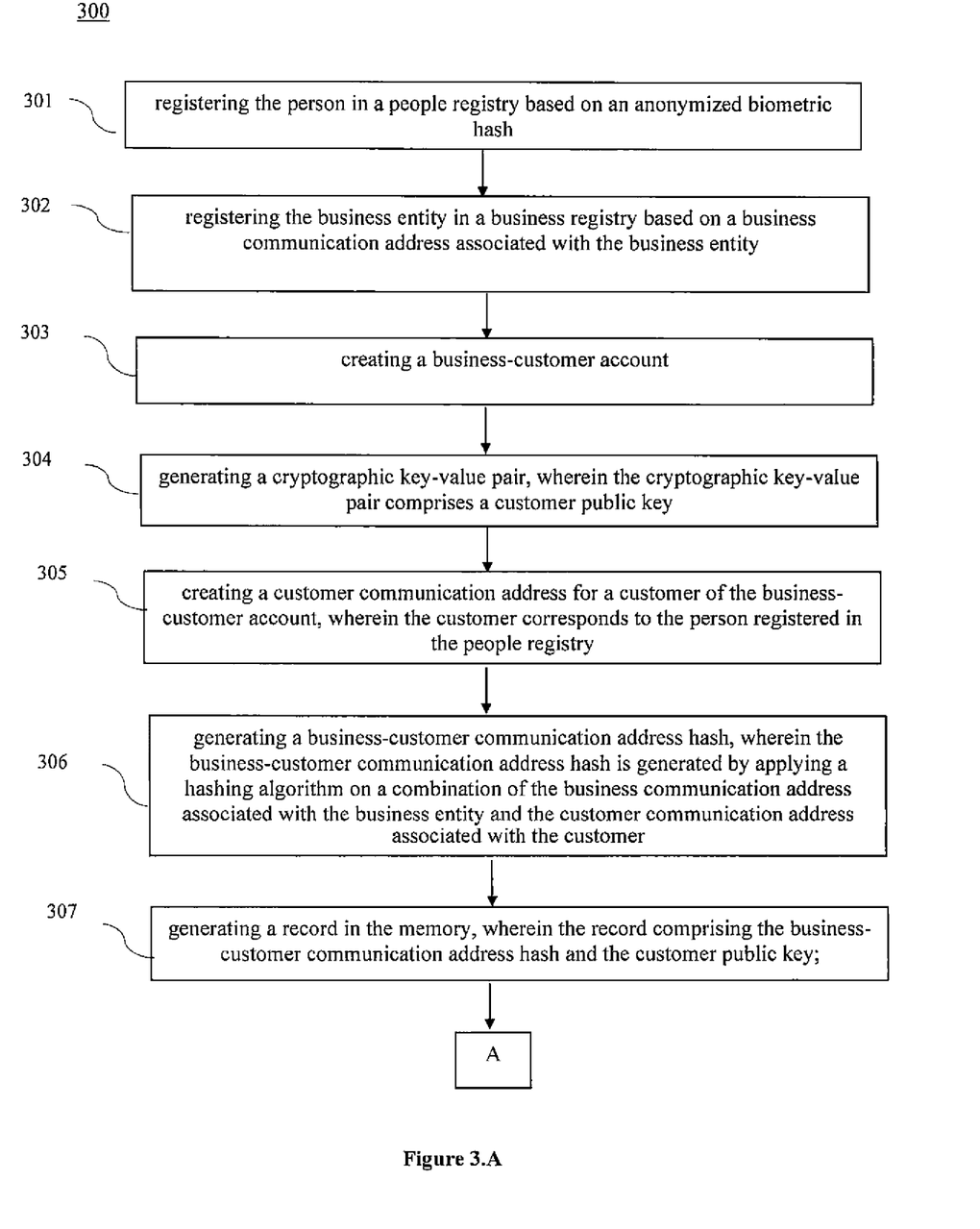

Now referring to FIGS. 3.A and 3.B, a flowchart describing a method 300 for enabling privacy-aware inter-channel communication between the business entity 102 and the person 103, is illustrated, in accordance with an embodiment of the present subject matter.

At step 301, the processor 201 may be configured to enable the person 103 to register in a people registry based on an anonymized biometric hash of the person. The registration of the person in the people registry may be performed by using the people registry module 205.

Figure 4:
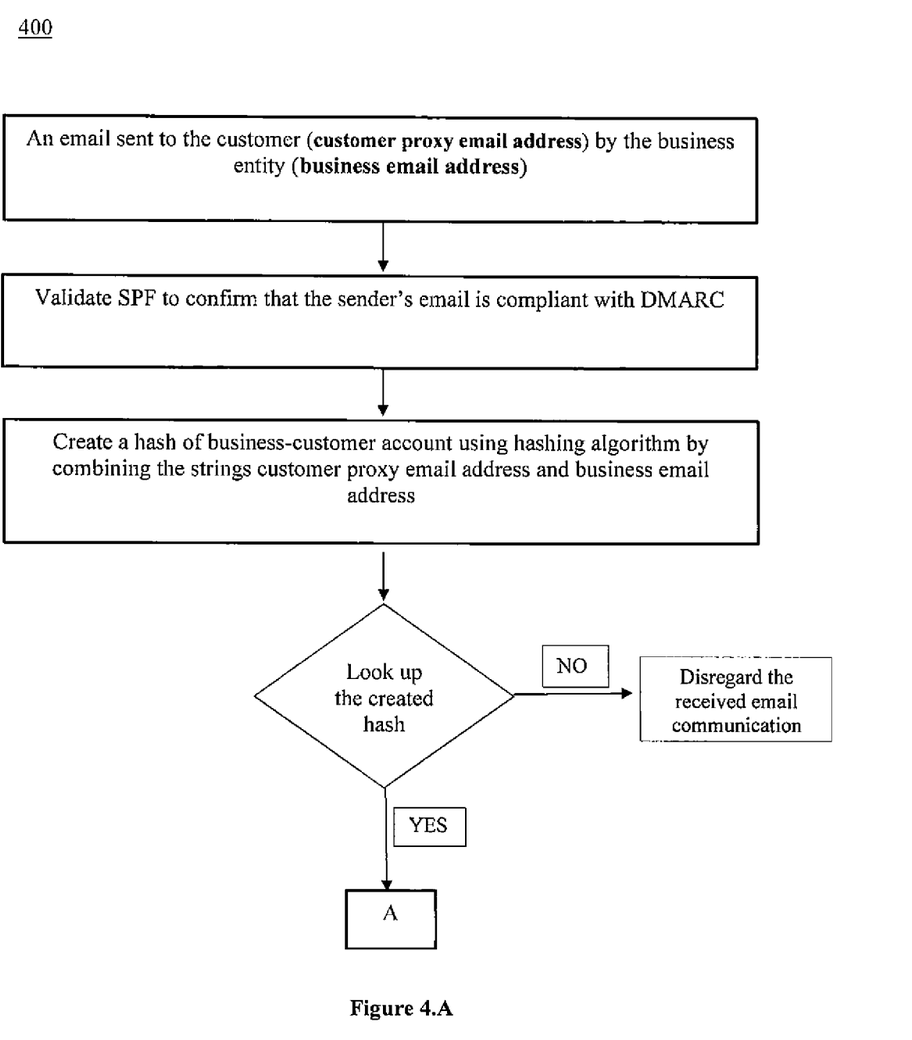

At step 302, the processor 201 may be configured to enable the business entity 102 to register in a business registry based on a business communication address associated with the business entity 102. The registration of the business entity to the business registry may be performed by using the business registry module 206. The detailed steps for authenticating the business entity 102 over the system 101 are further elaborated with reference to FIGS. 4.A and 4.B.

At step 303, the processor 201 may be configured for creating a business-customer account, using an account creation module 207.

At step 304, the processor 201 via the account creation module 207 may be configured to generate a cryptographic key-value pair. The cryptographic key-value pair may include the customer public key.

At step 305, the processor 201 via the account creation module 207 may be configured to create a customer communication address for the customer of the business-customer account. The customer communication address corresponds to proxy communication address such as but not limited to proxy email address, proxy phone number.

At step 306, the processor 201 via the account creation module 207 may be configured to generate the business-customer communication address hash. The business-customer communication address hash is generated by applying a hashing algorithm on a combination of the business communication address associated with the business entity 102 and the customer communication address associated with the customer 103.

At step 307, the processor 201 via the account creation module 207 may be configured to generate the record 212 in the memory 203. The record 212 comprising the customer public key corresponding to the business-customer communication address hash.

At step 308, the processor 201 via the authentication module 208 may be configured to authenticate the business-customer account on an event of the new communication between the business entity 102 and the customer 103. The steps for authenticating the business entity 102 using the system 101 are further illustrated in FIGS. 4.A and 4.B.

At step 309, the processor 201 via the authentication module 208 may be configured to extract from the new communication established between the business entity 102 and the customer 103, a first communication address associated with the business entity 102 and a second communication address associated with the customer 103.

At step 310, the processor 201 via the authentication module 208 may be configured to generate a communication address hash, using the hashing algorithm, based on the combination of both the first communication address associated with the business entity 102 and a second communication address associated with the customer 103.

At step 311, the processor 201 via the authentication module 208 may be configured to compare the communication address hash with the business-customer communication address hash from the record 212 stored in the memory 203. The steps for comparing the communication address hash stored in the record 212 using the system 101 are further illustrated in FIGS. 4.A and 4.B.

At step 312, the processor 201 is configured to convert the new communication into a customer-compatible communication, if the communication address hash matches with the business-customer communication address hash from the record 212 stored in the memory 203.

At step 313, the processor 201 is configured to encrypt the customer-compatible communication using the customer public key corresponding to the communication address hash. The steps for encrypting the communication using the system 101 are further illustrated in FIGS. 4.A and 4.B.

At step 314, the processor 201 is configured to transmit the encrypted communication to the customer 103, if the communication address hash match with the business-customer communication address hash from the record 209 stored in the memory 203. The steps for transmitting the communication using the system 101 are further illustrated in FIGS. 4.A and 4.B.

In another embodiment, the method 300 for communication between the business entity 102 and the person 103, without revealing the person's personal identifiable information, is disclosed. The method 300 may initiate the process with person registration in the people registry using anonymized biometric hashes, ensuring privacy and identity protection. Simultaneously, the business entity may register in the business registry, utilizing their communication addresses. Further, the business-customer account may be created using the account creation module 207, and further the cryptographic key-value pair may be generated including the customer public key and the customer communication address that corresponds to the registered person. Furthermore, the business-customer communication address hash may be generated by combining the business entity's communication address and the customer's address. The relevant record 209 is stored in memory 203.

In yet another embodiment, the communication between the business entity 102 and the customer 103 may be authenticated by comparing communication address hashes, and further if a match occurs, the communication may be converted to a customer-compatible communication and encrypted using the customer's public key. Moreover, if the event is successful, the encrypted communication is transmitted to the customer, safeguarding the communication's privacy and authenticity. This process guarantees secure and privacy-aware inter-channel communication, shielding individual identities while enabling meaningful interactions with businesses.

Now referring to FIGS. 4.A and 4.B illustrates an exemplary flow diagram 400 describing the method 300 for enabling privacy-aware multi-channel communication between the business entity 102 and the person 103 through email, in accordance with an embodiment of the present subject matter.

In an exemplary embodiment, the method 400 outlines the systematic handling of incoming emails within a secure communication framework. Further, the method may begin with an email sent from a business entity 102 to the customer's proxy email address. Further, the sender's email may be authenticated using Sender Policy Framework (SPF) to ensure Domain-based Message Authentication, Reporting and Conformance (DMARC) compliance, thereby confirming its legitimacy. Subsequently, a unique hash for the business-customer account may be generated by applying the hashing algorithm to the strings representing the customer's proxy email address and the business's email address.

Furthermore, the generated business-customer email address hash is then looked up in the system's records. If the hash is not found, the received email communication may be disregarded. However, if the hash is found, the method may proceed to determine the type of the email, distinguishing between transactional and promotional content. In the case of a transactional email, the email and its metadata may be converted to customer-compatible communication, encrypted using the customer's public key, and transmitted to the customer Furthermore, if the type of email is found to be promotional emails, the method may check the customer's promotion preference flag. If the flag is set to "NO," the promotional email may be disregarded. Alternatively, a templated reply may be dispatched to the business entity, notifying them of the customer's choice of not to receive a promotional message. Conversely, if the flag is set to "Yes," the email and its metadata may be converted to customer-compatible communication, encrypted with the customer's public key, and transmitted to the customer. Thus, the method ensures efficient, personalized, and secure communication while respecting customer preferences.

In another exemplary environment, the method may follow the similar process as described in FIGS. 4.A and 4.B for establishing the privacy-aware inter-channel communication between the business entity 102 and the customer 103 using a phone number. Further, the process may include sending a text message from the business entity 102 to the customer 102, wherein the text-message enable phone number is associated with the business entity 102 and the proxy virtual phone number is associated with the customer 103. The process may initiate by sending a text message to the customer's proxy virtual phone number. Further, the text-message enabled phone number associated with the business entity may be validated to determine whether it is genuine or spoofed. Further, if the text-messaged enabled phone number associated with the business entity is found to be spoofed, the text-message is disregarded. Furthermore, if the text-messaged enabled phone number associated with the business entity is not spoofed, a business-customer phone number hash may be created using the text-messaged enabled phone number and the customer proxy phone number using the hashing algorithm.

Furthermore, the generated business-customer phone number hash is then looked up in the system's records. If the hash is not found, the text message is disregarded. However, if the hash is found, the method may proceed to determine whether the type of the text-message is transactional or promotional. If it is a transactional message, it is converted to a customer-compatible communication, encrypted with customer's public key and transmitted to the customer.

Furthermore, if the type of text-message enabled phone number is found to be a promotional message, the method may check the customer's promotion preference flag. If the flag is set to "NO," the message is disregarded. Alternatively, a templated reply may be dispatched to the business entity, notifying them of the customer's choice of not to receive a promotional message. Conversely, if the flag is set to "Yes," the message is converted to a customer-compatible communication, encrypted with the customer's public key and transmitted to the customer. Thus, the method ensures efficient, personalized, and secure communication while respecting customer preferences.

In one embodiment, authenticating the email and the text-message enabled phone number received from the business entity 102 may involve several key steps. Firstly, the system may require the reception of the email or the text-message from a business entity 102 registered in the business registry 210, addressed to a customer proxy email address or the customer proxy virtual phone number that represents the person listed in the people registry 210. Further, the system 101 may verify the authenticity of the sender's email address or text-message enabled phone number to ensure whether communication is spoofed or not. The email address may be authenticated using SPF to ensure DMARC compliance. Further, if the email or phone number is found to be spoofed, the communication is disregarded.

In one embodiment, if the email sent by the business entity 102 to the customer 103 is found to be not compliant with DMARC using SPF authentication, the email is disregarded. Secondly, if the business-customer hash created for the new communication between the business entity 102 and the customer 103 is not found in the record 211, the communication is disregarded and logged in the system 101 in database 104 for any further reference. Furthermore, if the customer preference flag for the promotional message is found to be "NO", the communication is disregarded.

In another embodiment, the generated cryptographic key-value pair provides an encrypted end-to-end communication channel between the business entity 102 and the customer 103. Furthermore, the corresponding customer public key may be associated with the corresponding private key with the customer to decrypt the metadata in the message received from the business entity 102.

In yet another exemplary aspect, the business entity could use the system to communicate with its customers about new products and services, or to send them promotional messages. The customer could use the system to communicate with a business about a customer service issue, or to make a purchase.

Overall, the disclosed subject matter, in its simplest form, creates a framework for safe, privacy-aware inter-channel communication between business entities and people, protecting personal information and maintaining data integrity while enabling smooth, safe transactions.

Although implementations for the system 101 and the method 300 for privacy-aware inter-channel communication between the business entity and the person have been described in language specific to structural features and methods, it must be understood that the claims are not limited to the specific features or methods described. Rather, the specific features and methods are disclosed as examples of implementations for the system 101 and the method 300 for sharing user preferences, pertaining to one or more products, without having the user reveal their identity.

The system 101 as disclosed in the disclosure may provide privacy-aware inter-channel communication between the business entity and the person, offering several advantages by not revealing the person's personal identifiable information, including the following:

Enhanced privacy: The system uses an anonymized biometric hash as the primary identifier, which helps to protect the user's privacy. This is important because it prevents businesses from tracking users across different platforms and services.

Improved security: The system uses cryptographic key-value pairs to enforce the exclusive permission to exchange messages between the two parties. This helps to protect users from spam, phishing, and other malicious attacks.

End-to-end encryption: The system uses end-to-end encryption to protect all communication between users and businesses. This means that only the sender and receiver of a message can read the message.

Inversion of permission control: The system inverts permission control so that customers get to decide whether businesses are permitted to send them promotional messages.

Convenience: The system allows users to sign up for a service using a proxy email address or a virtual phone number, which can be more convenient than using their personal email address or phone number.

Streamlined Interoperability: The system simplifies communication across various messaging platforms, creating a unified experience that enhances user convenience and efficiency.

Various modifications to the embodiment will be readily apparent to those skilled in the art and the generic principles herein may be applied to other embodiments. However, one of ordinary skill in the art will readily recognize that the present disclosure is not intended to be limited to the embodiments illustrated but is to be accorded the widest scope consistent with the principles and features described herein.

The foregoing description shall be interpreted as illustrative and not in any limiting sense. A person of ordinary skill in the art would understand that certain modifications could come within the scope of this disclosure.

The embodiments, examples and alternatives of the preceding paragraphs or the description and drawings, including any of their various aspects or respective individual features, may be taken independently or in any combination. Features described in connection with one embodiment are applicable to all embodiments unless such features are incompatible.

The invention claimed is:

1. A system for privacy-aware inter-channel communication between a business entity and a person, comprising:
   a memory;
   a processor coupled with the memory, wherein the processor is configured to execute programmed instructions stored in the memory, the programmed instructions comprising:
      a people registry module configured to enable the person to register in a people registry, based on an anonymized biometric hash of the person;
      a business registry module configured to enable the business entity to register in a business registry, based on a business communication address associated with the business entity;
      an account creation module configured to create a business-customer account, wherein the business-customer account is created by:
         generating a cryptographic key-value pair, wherein the cryptographic key-value pair comprises a customer public key;
         creating a customer communication address for a customer of the business-customer account, wherein the customer corresponds to the person registered in the people registry;
         generating a business-customer communication address hash, wherein the business-customer communication address hash is generated by applying a hashing algorithm on a combination of the business communication address associated with the business entity and the customer communication address associated with the customer; and
         generating a record in the memory, wherein the record comprises the business-customer communication address hash and the customer public key;
      an authentication module configured for authenticating the business-customer account, on an event of a new communication between the business entity and the customer, by:
         extracting, from the new communication, a first communication address associated with the business entity and a second communication address associated with the customer;
         generating a communication address hash, using the hashing algorithm, based on the combination of both the first communication address and the second communication address; and
         comparing the communication address hash with the business-customer communication address hash, from the record stored in the memory;
      converting the new communication into a customer-compatible communication, if the communication address hash matches the business-customer communication address hash; and
      encrypting the customer-compatible communication, using the customer public key corresponding to the communication address hash; and
      transmitting the encrypted communication to the customer.

2. The system as claimed in claim 1, wherein the anonymized biometric hash comprises encrypted factors from one of face, fingerprint, iris, retina, voice, other biometric identity, or a combination thereof, and wherein the business communication address comprises an email address or a phone number, associated with the business entity, and wherein the customer communication address comprises a proxy email address or a proxy phone number, associated with the customer.

3. The system as claimed in claim 1, wherein the cryptographic key-value pair corresponds to the business-customer account representing a relationship between the business entity and the customer, and wherein the new communication comprises an email or a text message, sent by the business entity to the customer.

4. The system as claimed in claim 1, wherein the customer-compatible communication corresponds to a communication compatible with an application used by the customer for accessing the system, wherein the customer-compatible communication comprises a peer-to-peer (P2P) message.

5. The system as claimed in claim 1, wherein the processor is configured to disregard the new communication between the business entity and the customer if the communication address hash does not match the business-customer communication address hash.

6. The system as claimed in claim 1, wherein the record comprises a customer promotion preference flag for each of the business-customer communication address hash, wherein the customer promotion preference flag comprises either "YES" or "NO", and wherein the authentication module is configured to determine a type of the new communication, wherein the type of the new communication corresponds to either a transactional communication or a promotional communication.

7. The system as claimed in claim 6, wherein the processor is configured to encrypt the customer-compatible communication, using the customer public key, and transmitting the encrypted communication to the customer if the type of the new communication is transactional communication.

8. The system as claimed in claim 6, wherein the processor is configured to encrypt the customer-compatible communication using the customer public key and transmitting the encrypted communication to the customer if the type of the new communication is promotional communication and the customer promotion preference flag is "YES".

9. The system as claimed in claim 6, wherein the processor is configured to disregard the new communication from the business entity to the customer if the type of the new communication is promotional communication and the customer promotion preference flag is "NO".

10. The system as claimed in claim 1, wherein the hashing algorithm corresponds to a one-way hash function.

11. A method of privacy-aware inter-channel communication between a business entity and a person, the method comprising processor implemented steps of:
    registering the person in a people registry based on an anonymized biometric hash of the person;
    registering the business entity in a business registry based on a business communication address associated with the business entity;
    creating a business-customer account by:
       generating a cryptographic key-value pair, wherein the cryptographic key-value pair comprises a customer public key;
       creating a customer communication address for a customer of the business-customer account, wherein the customer corresponds to the person registered in the people registry;
       generating a business-customer communication address hash, wherein the business-customer communication address hash is generated by applying a hashing algorithm on a combination of the business communication address associated with the business entity and the customer communication address associated with the customer; and generating a record in the memory, wherein the record comprises the business-customer communication address hash and the customer public key;

authenticating the business-customer account on an event of a new communication between the business entity and the customer, by:

extracting, from the new communication, a first communication address associated with the business entity and a second communication address associated with the customer;

generating a communication address hash, using the hashing algorithm, based on the combination of both the first communication address and the second communication address; and comparing the communication address hash with the business-customer communication address hash, from the record stored in the memory;

converting the new communication into a customer-compatible communication, if the communication address hash matches the business-customer communication address hash, and encrypting the customer-compatible communication, using the customer public key corresponding to the communication address hash; and transmitting the encrypted communication to the customer.

12. The method as claimed in claim 11, wherein the anonymized biometric hash comprises encrypted factors from one of face, fingerprint, iris, retina, voice, other biometric identity, or a combination thereof, and wherein the business communication address comprises an email address or a phone number, associated with the business entity, and wherein the customer communication address comprises a proxy email address or a proxy phone number, associated with the customer.

13. The method as claimed in claim 11, wherein the cryptographic key-value pair corresponds to the business-customer account representing a relationship between the business entity and the customer, and wherein the new communication comprises an email or a text message, sent by the business entity to the customer.

14. The method as claimed in claim 11, wherein the customer-compatible communication corresponds to a communication compatible with an application used by the customer performing the method, wherein the customer-compatible communication comprises a peer-to-peer (P2P) message.

15. The method as claimed in claim 11, wherein the method enables the processor to disregard the new communication from the business entity to the customer, if the communication address hash does not match with the business-customer communication address hash.

16. The method as claimed in claim 11, wherein the record comprises a customer promotion preference flag for each of the business-customer communication address hash, wherein the customer promotion preference flag comprises either "YES" or "NO", and wherein the method comprises enabling the processor to determine a type of the new communication, wherein the type of the new communication corresponds to either a transactional communication or a promotional communication.

17. The method as claimed in claim 16, wherein the method comprises enabling the processor to encrypt the compatible communication using the customer public key and to transmit the encrypted communication to the customer if the type of the new communication is transactional communication.

18. The method as claimed in claim 16, wherein the method comprises enabling the processor to encrypt the compatible communication using the customer public key and to transmit the encrypted communication to the customer if the type of the new communication is promotional communication and the customer promotion preference flag is "YES".

19. The method as claimed in claim 16, wherein the method comprises enabling the processor to disregard the new communication from the business entity to the customer if the type of the new communication is promotional communication and the customer promotion preference flag is "NO".

20. The method as claimed in claim 11, wherein the hashing algorithm corresponds to a one-way hash function.

* * * * *